United States Patent
Kuckelkorn et al.

(10) Patent No.: US 7,793,653 B2
(45) Date of Patent: Sep. 14, 2010

(54) RADIATION-SELECTIVE ABSORBER COATING WITH AN ADHERENT OXIDE LAYER AND METHOD OF MAKING SAME

(75) Inventors: Thomas Kuckelkorn, Weiden (DE); Wolfgang Graf, Eschbach (DE)

(73) Assignee: Schott AG, Mainz (DE)

( * ) Notice: Subject to any disclaimer, the term of this patent is extended or adjusted under 35 U.S.C. 154(b) by 1165 days.

(21) Appl. No.: 11/064,297

(22) Filed: Feb. 23, 2005

(65) Prior Publication Data
US 2005/0189525 A1    Sep. 1, 2005

(30) Foreign Application Priority Data
Feb. 27, 2004   (DE) ................ 10 2004 010 689

(51) Int. Cl.
*F24J 2/50* (2006.01)
(52) U.S. Cl. ............. 126/651; 126/652; 252/582; 257/184; 428/621; 359/885
(58) Field of Classification Search ........ 126/651, 126/652; 252/582; 257/184; 428/621; 359/885
See application file for complete search history.

(56) References Cited

U.S. PATENT DOCUMENTS

| | | | | |
|---|---|---|---|---|
| 3,377,195 A | * | 4/1968 | Sneesby ............... | 427/432 |
| 3,833,430 A | | 9/1974 | Hill et al. | |
| 4,122,239 A | * | 10/1978 | Riboulet et al. ........ | 428/621 |
| 4,376,801 A | * | 3/1983 | Schardein ............. | 428/336 |
| 4,416,916 A | | 11/1983 | Aykan et al. | |
| 4,442,166 A | * | 4/1984 | Fan .................. | 428/323 |
| 4,511,439 A | | 4/1985 | Cornils et al. | |
| 4,687,053 A | * | 8/1987 | Paulus et al. ........... | 165/133 |
| 4,777,936 A | * | 10/1988 | Arai ................... | 126/652 |
| 4,849,305 A | * | 7/1989 | Yanagisawa ........... | 428/833 |
| 5,019,458 A | * | 5/1991 | Elgat et al. ............ | 428/630 |
| 5,523,132 A | * | 6/1996 | Zhang et al. .......... | 428/34.4 |

(Continued)

FOREIGN PATENT DOCUMENTS

DE    198 53 285 C1    6/2000

(Continued)

OTHER PUBLICATIONS

Michael Lanxner et al: "Solar Selective Absorber Coating . . . " SPIE vol. 1272, Optical Material Technology for Energy Efficiency and Solar Energy Conversion IX, 1990, pp. 240-248.

*Primary Examiner*—Steven B McAllister
*Assistant Examiner*—Avinash Savani
(74) *Attorney, Agent, or Firm*—Michael J. Striker

(57) ABSTRACT

The absorber pipe for solar thermal applications consists of a metal pipe and a radiation-selective absorber coating applied to the outer surface of the metal pipe. The radiation-selective absorber coating consists of, in sequence from the outer surface toward an exterior: a diffusion barrier layer, a metallic reflective layer a cermet layer, and an anti-reflective layer. The diffusion barrier layer is an oxide layer on the outer surface of the preferably steel or stainless steel pipe which is formed by an oxidation process during tempering and which includes oxidized components of the metal pipe. The tempering is preferably performed in air in an oven at a temperature of 400 to 600° C. for 0.5 to 2 hours.

3 Claims, 1 Drawing Sheet

U.S. PATENT DOCUMENTS

| | | | |
|---|---|---|---|
| 5,670,248 A * | 9/1997 | Lazarov et al. | 428/304.4 |
| 5,899,199 A * | 5/1999 | Mills | 126/577 |
| 6,128,126 A * | 10/2000 | Hohenegger et al. | 359/360 |
| 6,234,166 B1 * | 5/2001 | Katsir et al. | 126/701 |
| 6,261,694 B1 * | 7/2001 | Iacovangelo | 428/412 |
| 6,451,130 B1 | 9/2002 | Chung et al. | |
| 6,637,427 B1 * | 10/2003 | Yeomans | 126/675 |
| 6,974,976 B2 * | 12/2005 | Hollars | 257/184 |

FOREIGN PATENT DOCUMENTS

| | | |
|---|---|---|
| GB | 2 001 677 | 2/1979 |
| JP | 53075132 | 7/1978 |
| WO | 95/08656 | 3/1995 |

* cited by examiner

RADIATION-SELECTIVE ABSORBER COATING WITH AN ADHERENT OXIDE LAYER AND METHOD OF MAKING SAME

BACKGROUND OF THE INVENTION

The present invention relates to an absorber with a radiation-selective coating comprising a metal substrate, a diffusion barrier layer, a metallic reflective layer, a cermet layer and an anti-reflective layer. The invention also relates to a method of making an absorber with a radiation-selective absorber coating, in which a metal absorber is polished, is adjusted to a surface roughness at $r_a$<0.3 µm and a diffusion barrier layer, a metallic reflective layer, a cermet layer and an anti-reflective layer are applied to it.

Selective absorber coatings, which are characterized by a high solar absorption coefficient and low thermal emission, are used in thermal solar energy applications for radiation conversion.

Predominantly thin layer systems based on cermet (ceramic-metal mixture) are used, which are produced by vapor deposition or sputtering. The structure of this sort of layer system starting from the substrate surface and progressing to the exterior comprises of the following sequence of layers: a metallic reflective layer, cermet layer and anti-reflective layer.

The metallic reflective layer usually comprises a metal that is highly reflective in the infrared range, such as copper, aluminum or molybdenum. The cermet layer usually comprises an oxide, such as $Al_2O_3$, $SiO_2$, which is embedded in a metal, such as Mo. The metal fraction is designated the filling factor.

The anti-reflective layer comprises a pure oxide, such as e.g. $SiO_2$ or $Al_2O_3$.

In order to guarantee good adherence of the coating to the substrate, such as copper, stainless steel or glass, additional adhesive layers are used. These adhesive layers comprise chiefly chromium or are chromium-based layers.

Operating temperatures between 300° C. and 600° C., which especially occur in solar concentrating thermal systems, depend on diffusion processes within the absorber layer system and through the absorber layer system. These diffusion processes act negatively on the performance of the entire system.

The following effects are distinguished: The diffusion of elements from the substrate into the absorber coating, which causes a change in the layer properties. For example, in the case of a steel substrate iron diffuses into the layer system.

With vacuum components, such as pipe collectors or receiver pipes for a parabolic gutter or trough, diffusion processes can lead to loss of the vacuum. Because of that the output is reduced. Gas can issue from the substrate or can diffuse through the pipe and through the coating into the vacuum from the heat exchanger passing through the pipe. For example, $H_2$ diffusion through the steel substrate or through the stainless steel substrate is known as one diffusion process.

Absorber pipes made from stainless steel, which are arranged in an evacuated glass tube, are known from "Solar selective absorber coating for high service temperatures, produced by plasma sputtering" by M. Lanxner and Zvi Elgat, SPI"E Vol. 1272, in Optical Materials Technology for Energy Efficiency and Solar Energy Conversion IX (1990), pp. 240 ff. These pipes, which absorb solar energy, conduct a heat exchanger liquid, whose energy is converted into electrical current. The absorber surface has a temperature of 350 to 400° C.

In order to prevent diffusion effects between substrate and absorber coating from occurring, a diffusion barrier layer of $Al_2O_3$ is provided. Before the $Al_2O_3$ layer is sputtered on, the metal surface of the pipe is polished, so that the average roughness is less than 0.2 µm. After polishing a cleaning process occurs in vacuum under heat transfer.

However diffusion barrier layers from sputtered materials have the disadvantage that they have a porous structure, so that their effectiveness in preventing diffusion is thereby reduced.

SUMMARY OF THE INVENTION

It is an object of the present invention to improve the diffusion blocking and adherence properties of the substrate surfaces on steel or stainless steel substrates, on which radiation-selective absorber coatings are applied.

This object is attained with an absorber, which is characterized by a diffusion barrier that is an oxide layer, which comprises oxidized components of the metal substrate.

The oxide layer forms a diffusion barrier layer between the absorber coating and the substrate. It prevents or reduces transport and diffusion processes involving transport from the substrate as well as gas diffusion through the substrate in radiation-selective absorber coatings. This type of oxide layer has the advantage that it provides a good basis for adherence for the following absorber coating to be applied.

Advantageously the metal substrate comprises steel or noble steel and the oxides are iron oxide and/or chromium oxide.

The oxide layer preferably has a thickness between 50 and 200 nm, especially between 50 and 100 nm.

An absorber pipe according to the invention for solar-thermal applications comprises steel or stainless steel with a metallic reflective layer, a cermet layer, and an anti-reflective layer. It is characterized by a diffusion barrier layer between the pipe outer surface and the metallic reflective layer, which is an oxide layer, which comprises iron oxide and/or chromium oxide.

The method according to the invention for making an absorber pipe with a radiation-selective coating comprises polishing an absorber made of metal, i.e. polishing a surface of the absorber, and adjusting its roughness to $r_a$<0.3 µm and subsequently applying a radiation-selective coating to it, and is characterized by the step of tempering the polished substrate surface, on which the diffusion barrier layer is formed, in air in an oven at a temperature of 400 to 600° C. for 0.5 to 2 hours.

An oxide layer is formed on the surface, which is observable visually because of a brown to blue coloration, because of this tempering process.

The oxidation process in the oven stops after a certain layer thickness is attained. It has been shown that the layer thickness depends on the surface roughness. The greater the surface roughness, the thicker is the oxide layer.

Preferably the substrate is polished mechanically or electrically. The term "electrically polishing" means a reversible galvanic process.

BRIEF DESCRIPTION OF THE DRAWING

The objects, features and advantages of the invention will now be described in more detail with the aid of the following description of the preferred embodiments, with reference to the accompanying figures in which.

DETAILED DESCRIPTION OF THE INVENTION

Figure 1:
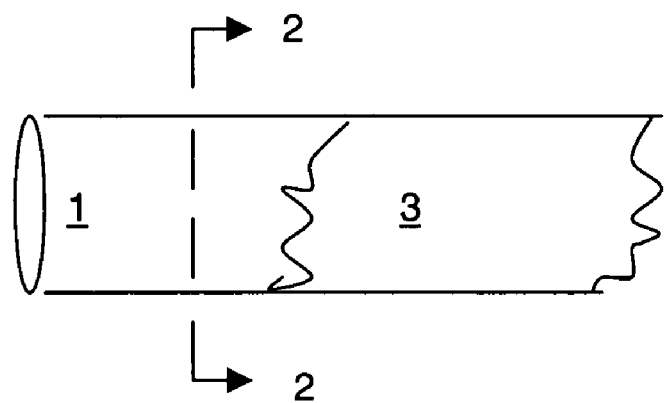
FIG. 1 is a cutaway side view of an absorber pipe according to the invention with the radiation-selective absorber coating shown cutaway.

The absorber pipe 1 according to the invention is shown in FIG. 1. The absorber pipe 1 is provided with a radiation-selective absorber coating 3 by the method described above in general and also according to the detailed example provided hereinbelow.

Figure 2:
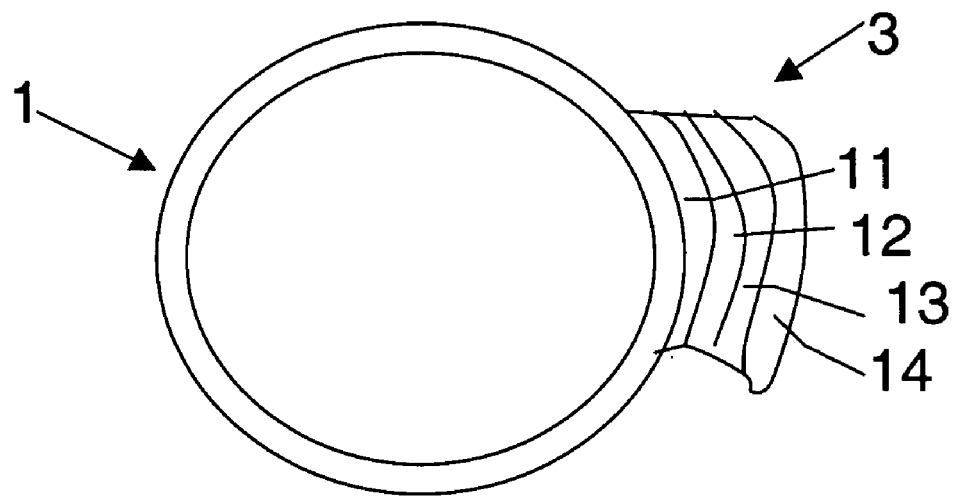
FIG. 2 is a cross-sectional view through the absorber pipe with the radiation selective absorber coating of FIG. 1 taken along the section line 2-2 in FIG. 1.

A portion of the radiation-selective absorber coating 3 is shown cutaway in FIG. 2 to illustrate its layer structure. In the embodiment shown here the radiation-selective absorber coating 3 is composed of the following layers in sequence from the outer surface of the absorber pipe 1 toward the exterior: a diffusion barrier layer 11, a metallic reflective layer 12, a cermet layer 13 and an anti-reflective layer 14, as seen in FIG. 2. In the example provided here the diffusion-blocking layer 11 comprises iron oxide and chromium oxide. The metallic reflective layer, the cermet layer and the anti-reflective layer can have compositions as described in the background section of the invention hereinabove. For example the anti-reflective layer can comprise silica or alumina.

EXAMPLE

A polished stainless steel surface (material 1.4404) is tempered for one hour in air in an air-circulating oven. The oven temperature is from 450 to 550° C. Longer tempering is required if the tempering temperatures are lower. The material is first polished so that the surface roughness is $r_a$<0.3 µm. A 50 nm- to 100 nm-thick diffusion barrier consisting of the oxide layer is formed by this tempering process. The oxidation process stops after reaching the above-mentioned layer thickness.

After finishing the tempering process a radiation-selective absorber layer system is applied to the substrate under vacuum.

The disclosure in German Patent Application 10 2004 010 689.4-15 of Feb. 27, 2004 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a radiation-selective absorber coating with an adherent oxide layer and method of making same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An absorber for solar thermal application comprising: a metal substrate and a radiation-selective coating applied to a surface of the metal substrate;
   wherein said radiation-selective coating comprises, in sequence from the surface of the metal substrate toward an exterior, a diffusion barrier layer, a metallic reflective layer, a cermet layer and an anti-reflective layer;
   wherein said metal substrate consists of stainless steel; and
   wherein said diffusion barrier layer is an oxide layer, said oxide layer consists of oxidized components of the metal substrate, and said oxidized components comprise iron oxide and chromium oxide.

2. The absorber for solar thermal application as defined in claim 1, wherein the oxide layer has a thickness between 50 and 200 nm.

3. The absorber for solar thermal application as defined in claim 2, wherein said thickness is between 50 and 100 nm.

* * * * *